E. AMMANN-HABERSTITCH.
MACHINE FOR DRYING STRIPS.
APPLICATION FILED FEB. 15, 1918.
1,400,508.
Patented Dec. 20, 1921.
2 SHEETS—SHEET 1.
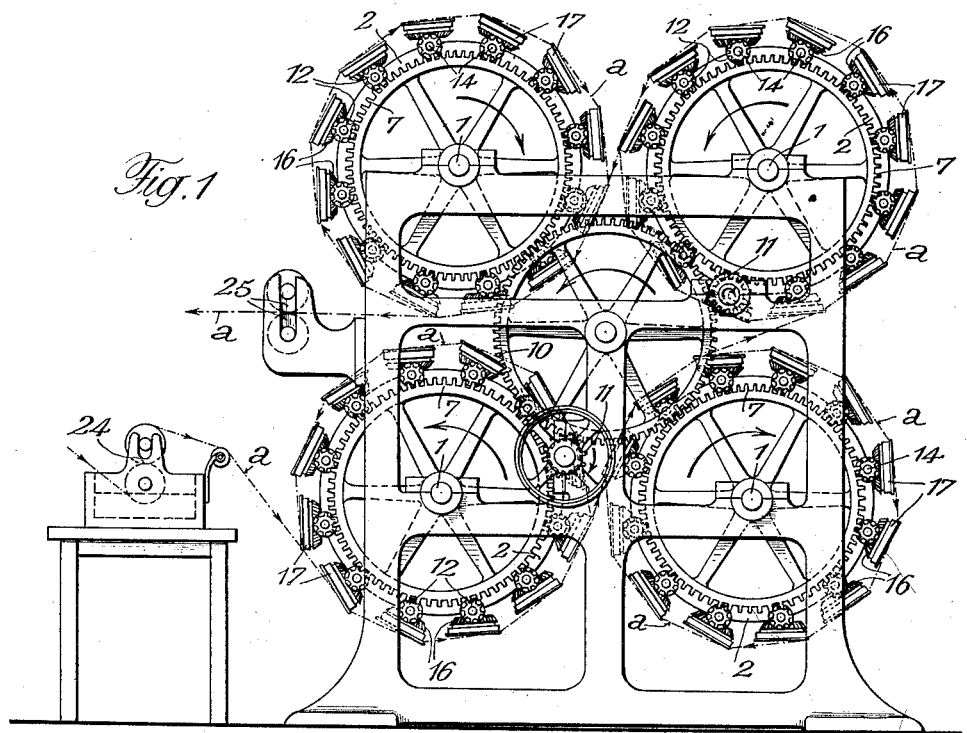
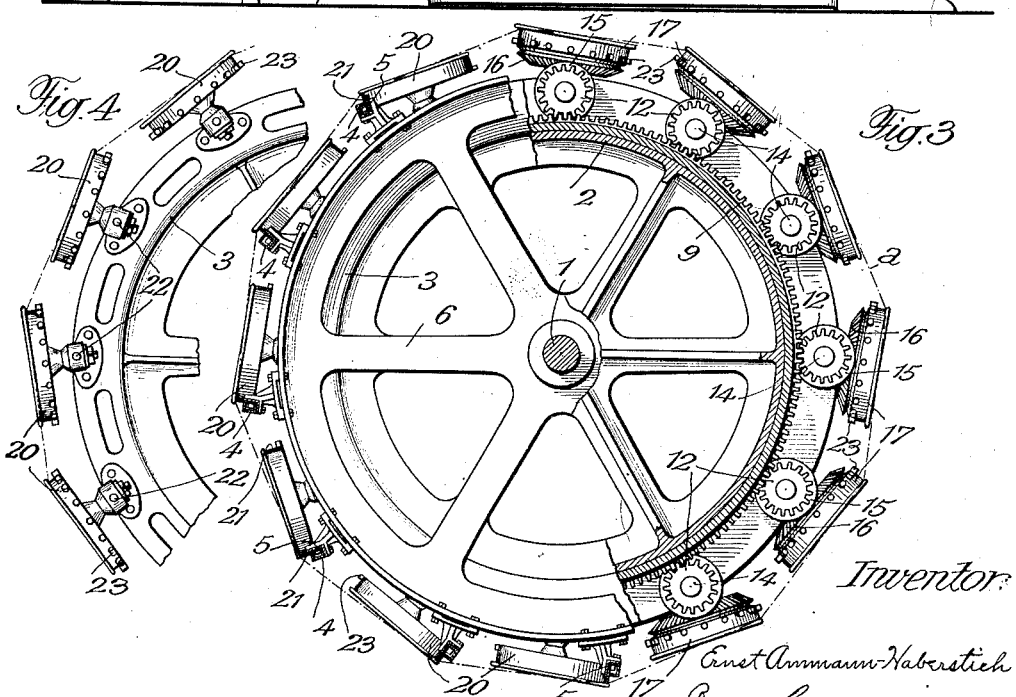
Inventor:
Ernst Ammann-Haberstich
atty.

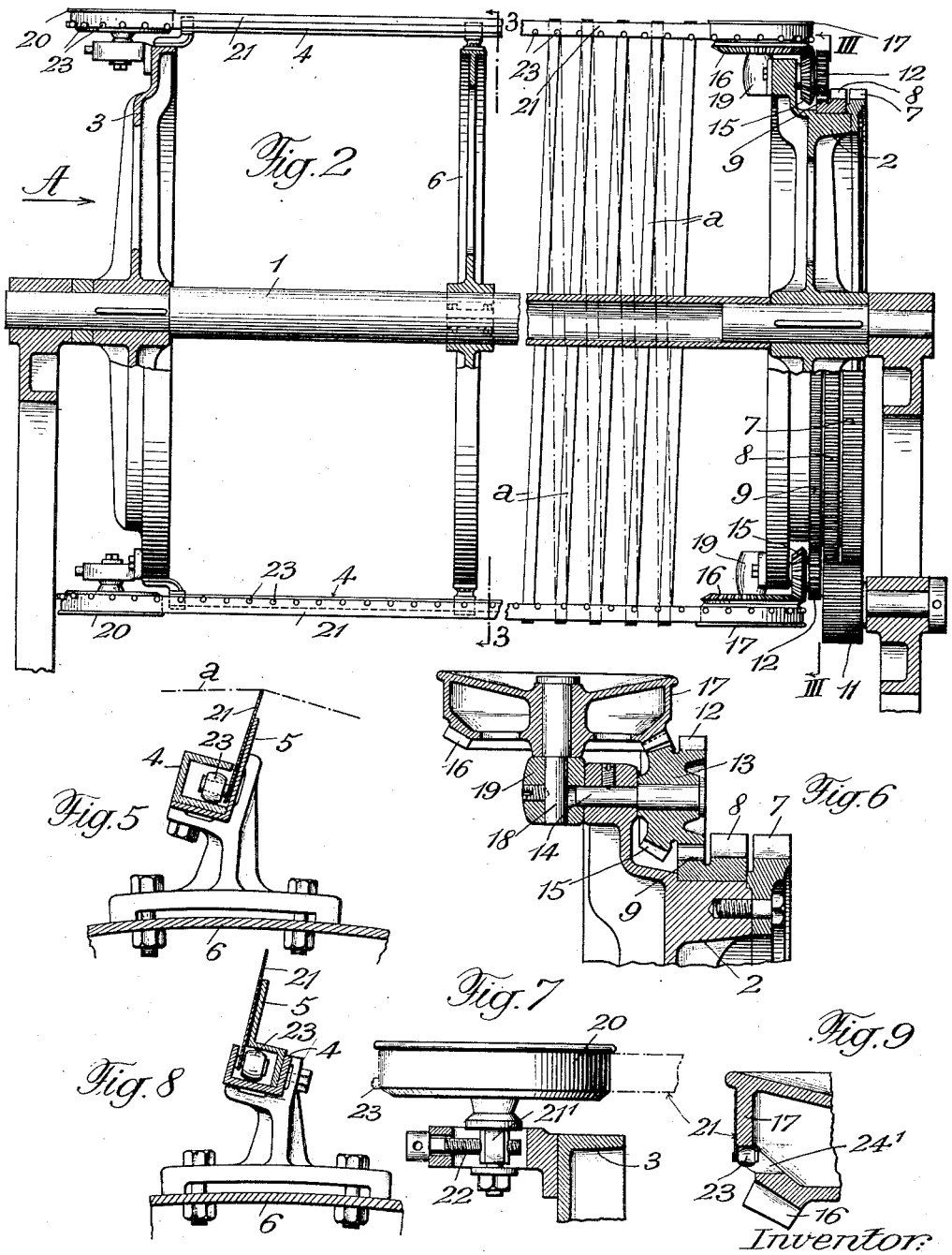

UNITED STATES PATENT OFFICE.

ERNST AMMANN-HABERSTICH, OF BASEL, SWITZERLAND.

MACHINE FOR DRYING STRIPS.

1,400,508.  Specification of Letters Patent.  Patented Dec. 20, 1921.

Application filed February 15, 1918. Serial No. 217,360½.

*To all whom it may concern:*

Be it known that I, ERNST AMMANN-HABERSTICH, a citizen of the Republic of Switzerland, residing at Basel, Lenzgasse 14, Switzerland, have invented certain new and useful Improvements in Machines for Drying Strips, (for which I have filed applications as follows: in Switzerland Feb. 2, 1917, #88,804, and in Germany Feb. 21, 1917, #A.29,090;) and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to a machine for drying strips comprising at least one reel and endless carriers or supports for the strips. These supports are adapted to effect a transverse movement of the strips to be wound on the reel and consist of metallic straps running over rollers arranged nearly tangentially to the reel. In such a machine, the drive may be transmitted to the reel and said rollers by means of coaxially arranged toothed rims, the one of which is rigidly connected to the axis of the reel while the second one is rotatable relatively to the first one and is provided with a different number of teeth than the latter. Said two toothed rims may thereby receive the drive from a common shaft.

This invention will now be more particularly described with reference to the accompanying drawings, which illustrate constructional examples of the invention. In these drawings:

Figure 1 is a side view of the machine comprising several reels;

Fig. 2 is a view, partly in section, of a reel seen in a direction at right angles to its axis;

Fig. 3 is a section of the reel, the left hand side of this figure being a section on the line 3—3 and the right hand side a section on the line III—III of Fig. 2;

Fig. 4 is a part of a side view of the reel seen in the direction of the arrow A of Fig. 2;

Figs. 5, 6 and 7 are details of this embodiment and

Figs. 8 and 9 show modifications of details of the illustrated embodiment.

Referring to the drawings, it will be seen, that on each end of the reel-shaft 1 is fixed a disk 2 and 3 respectively. The disks 2 and 3 are connected by means of guide-rails 4, 5 parallel to each other and to the shaft 1. The guide-rails 4, 5 are distributed in an equal manner over the circumference of the reel. 6 denotes a supporting disk for the guide-rails 4, 5 mounted on the shaft 1 between the disks 2 and 3. Only one such disk 6 is illustrated in the drawing. It is, however, evident, that any desired number of such disks 6 may be provided in a reel.

To the lateral disk 2 is fixed a toothed rim 7. A ring provided with two toothed rims 8, 9 is loose on said lateral disk 2. The pitch-circle of the toothed rim 8 corresponds to that of the toothed rim 7. The two toothed rims 7 and 8 have, however, a different number of teeth, one of them having one or a pair of teeth more or less than the other toothed rim. The toothed rims 7, 8 receive their drive from a toothed wheel 10 and 11 respectively. The width of the wheels 10 and 11 is the same as that of the two rims 7 and 8 together, so that they are adapted to engage simultaneously with both toothed rims 7 and 8. The embodiment shown on the drawings comprising four reels of the hereinbefore described type is provided with two toothed wheels 11 and a toothed wheel 10. The latter engages with the toothed rims 7, 8 of two opposite reels, while each of the toothed wheels 11 meshes on the one hand with the toothed wheel 10 and on the other hand with the toothed rims 7, 8 of the two remaining wheels, in order to impart to the latter the required revolving movement.

The toothed rim 9 meshes with the spur gear rims 12 of the pinions or drivers 13 mounted on bolts 14. The bolts 14 are fixed to the lateral disk 2. Each of the pinions 13 is further provided with a toothed rim 15 adapted to coöperate with the toothed rim 16 of a roller 17. The toothed rims 15 and 16 constitute together a bevel gear system. The roller 17 is mounted on a bolt 18 arranged obliquely relatively to the shaft 1 and supported by a bearing 19 fixed to the lateral disk 2. Opposite each roller 17 is mounted on the lateral disk 3 a roller 20 carried by a bolt 21¹. The latter is parallel to the bolt 18 of the roller 17. 21 denotes an endless metallic strap running over the rollers 17, 20. This strap can be tensioned in any desired manner by adjusting the roller 20 by means of a tension screw 22. The metallic strap 21 is provided near its lower edge with small rollers 23. One half of each metallic strap 21 is guided by one of the guide-rails 4 and one of the guide-rails 5. The rollers 23 are arranged in a part having an U-shaped cross-section of the guide-rails 4, 5, the part 5 acting thereby as a support for the metallic strap. The plane of the rollers 17, 20 is not exactly tangential to the lateral disks 2 and 3, so that a strip $a$ to be dried wound around the reel comes to rest on only that half of the metallic straps 21, which is guided in a pair of guide-rails 4, 5, while the other half of said straps lies freely beneath the strip $a$.

The drive of the reel of the hereinbefore described machine is transmitted to one of the toothed wheels 11, from which it is then transmitted to all four reels. The strip $a$ to be dried on the machine, which may be for instance a bast-strip or bast-rope, an advertising strip, a paper strip or the like, is wound, after having been fed at first through the glue-apparatus 24, onto the reel arranged next to said apparatus 24 and, after having been fed over said reel, it is then wound onto the reel arranged sidewise of said first mentioned reel; thereupon it is then fed successively over the remaining two reels arranged above the two first mentioned ones and finally through finishing calenders 25.

In consequence of the fact, that the two toothed rims 7 and 8 have not the same number of teeth, the ring carrying the toothed rims 8, 9 is rotated relatively to the toothed rim 7 and the disks 2, 3, 6, so that the drivers 13 are also rotated relatively to said disks, which causes a movement of the metallic straps in a transverse direction relatively to the direction of rotation of the reels. Owing to this movement of those halves of the metallic straps which act as supports for the material to be dried, i. e. of those halves of the straps situated within the guide-rails, the strip $a$ is wound along a helical line upon each reel.

In the embodiment illustrated in Figs. 1 to 7, the rollers 23 are arranged on the outside of the metallic strap 21. The rollers 23 may, however, also be arranged on the inside of said metallic straps 21. Such a construction is shown in Figs. 7 and 8, according to which the rollers 17 and 20 are provided with recesses 24¹ into which project the guide-rollers 23 provided on the metallic strap 21.

Owing to the hereinbefore described shape of the supports for the material to be dried, the machine may be designed very large and it can be made relatively light, it being thus possible to dry on such a machine in a very short time a great quantity of strips. It has been possible to dry, for instance, in such a machine about 200–250,000 meters of bast-rope having a width of 4 millimeters in about 10 hours without the necessity of too great heat.

In consequence of the great length of the strip passing through the machine, said strip is subjected sufficiently long to the natural drying action. As a result of the use of metallic supporting straps and the direct transmission of the movement to the rollers for the metallic straps by means of toothed gearings, the friction is reduced to a minimum; at the same time the construction is such, that the machine is always in proper working order and very reliable in working.

It will be seen, that several strips may be dried simultaneously in the improved machine and that the latter may be fitted with any desired number of reels.

What I claim as my invention is:

1. A machine for drying strips, comprising a reel, rollers arranged nearly tangentially to the reel, endless metallic supports for the strips to be dried tensioned over said rollers and means for rotating the reel and imparting a movement to said rollers, for the purpose of causing the metallic supports to move the strips in a transverse direction while they are wound on the reel.

2. A machine for drying strips, comprising a reel, rollers arranged nearly tangentially to the reel, endless metallic supports for the strips to be dried tensioned over said rollers, a toothed rim fixed to the reel, a second toothed rim mounted on the reel, arranged coaxially and movable relatively to the first mentioned rim and having another number of teeth than the latter, an operative connection between the second toothed rim and said rollers and a common driving shaft for the two toothed rims.

3. A machine for drying strips, comprising a reel, rollers arranged nearly tangentially to the reel, endless metallic supports for the strips to be dried tensioned over said rollers, a toothed rim fixed to the reel, a second toothed rim mounted on the reel, arranged coaxially and movable relatively to the first mentioned rim and having another number of teeth than the latter, an operative connection between the second toothed rim and said rollers, a toothed wheel adapted to engage simultaneously with both said toothed rims and a drive connected to said toothed wheel.

4. A machine for drying strips, comprising a reel, rollers arranged nearly tangentially to the reel, endless metallic straps, one half of each such strap acting as a support for the strips to be wound on the reel, guides for the strap-halves acting as supports, said guides being fixed to the reel and means for rotating the reel and imparting a movement to said rollers for causing the metallic strap to move the strips in a transverse direction while they are wound on the reel.

5. A machine for drying strips, comprising a reel, rollers arranged nearly tangentially to the reel, endless metallic straps, one half of each such strap acting as a support for the strips to be wound on the reel, guides for the strap-halves acting as supports, rollers provided on the metallic straps and coöperating with said guides in order to reduce the friction of the metallic straps in the said guides and means for rotating the reel and imparting a movement to said rollers arranged nearly tangentially on the reel, for the purpose of causing the metallic straps to move the strips in a transverse direction while they are wound on the reel.

In testimony that I claim the foregoing as my invention, I have signed my name.

E. AMMANN-HABERSTICH.